US009060080B2

(12) United States Patent
Ikeda

(10) Patent No.: US 9,060,080 B2
(45) Date of Patent: Jun. 16, 2015

(54) IMAGE PROCESSING APPARATUS, METHOD FOR CONTROLLING THE SAME, AND STORAGE MEDIUM FOR GENERATING IMAGE DATA BASED ON A READ DOCUMENT

(75) Inventor: Toru Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 716 days.

(21) Appl. No.: 13/233,842

(22) Filed: Sep. 15, 2011

(65) Prior Publication Data

US 2012/0081734 A1    Apr. 5, 2012

(30) Foreign Application Priority Data

Oct. 1, 2010   (JP) .................................. 2010-223434

(51) Int. Cl.
 *G06K 15/00*   (2006.01)
 *H04N 1/00*   (2006.01)
(52) U.S. Cl.
 CPC ....... *H04N 1/00244* (2013.01); *H04N 1/00464* (2013.01); *H04N 2201/0015* (2013.01); *H04N 2201/0094* (2013.01)
(58) Field of Classification Search
 CPC ............................. H04N 1/32374; G06F 3/12
 See application file for complete search history.

(56) References Cited

U.S. PATENT DOCUMENTS

| 8,307,251 | B2 * | 11/2012 | Yamada ......................... 714/748 |
| 8,427,673 | B2 * | 4/2013 | Yamaguchi et al. ......... 358/1.15 |
| 2002/0018245 | A1 * | 2/2002 | Saito et al. ..................... 358/468 |
| 2004/0190073 | A1 * | 9/2004 | Kato et al. ..................... 358/400 |
| 2005/0063003 | A1 * | 3/2005 | Mishima et al. .............. 358/1.15 |
| 2006/0092468 | A1 * | 5/2006 | Matsushima ................. 358/1.15 |
| 2006/0268332 | A1 * | 11/2006 | Shimada ....................... 358/1.15 |
| 2007/0070401 | A1 * | 3/2007 | Okamoto et al. ............. 358/1.15 |
| 2007/0074291 | A1 * | 3/2007 | Lee ................................. 726/24 |
| 2008/0007755 | A1 * | 1/2008 | Murakami et al. ........... 358/1.13 |
| 2010/0053674 | A1 * | 3/2010 | Kano ............................. 358/1.15 |
| 2011/0004789 | A1 * | 1/2011 | Tsujimoto ....................... 714/18 |
| 2011/0149341 | A1 * | 6/2011 | Ko ................................. 358/1.15 |

FOREIGN PATENT DOCUMENTS

| CN | 1185879 A | 6/1998 |
| JP | 2002135291 A | 5/2002 |
| JP | 2003032421 A | 1/2003 |
| JP | 2010-56770 A | 3/2010 |

* cited by examiner

*Primary Examiner* — Hilina K Demeter
(74) *Attorney, Agent, or Firm* — Canon USA, Inc. IP Division

(57) ABSTRACT

Provided is an apparatus that includes a generation unit configured to generate image data based on a document read via a scanner unit and a first transmission unit configured to transmit the generated image data to a designated destination. The apparatus includes a transmission server, an instruction unit configured to instruct, according to reception of an uploading request to upload the generated image data to an external server communicable with the apparatus, the first transmission unit to transmit the image data to the transmission server and a second transmission unit configured to acquire the image data transmitted by the first transmission unit according to the instruction from the instruction unit from the transmission server, and transmit the acquired image data to the external server.

14 Claims, 14 Drawing Sheets

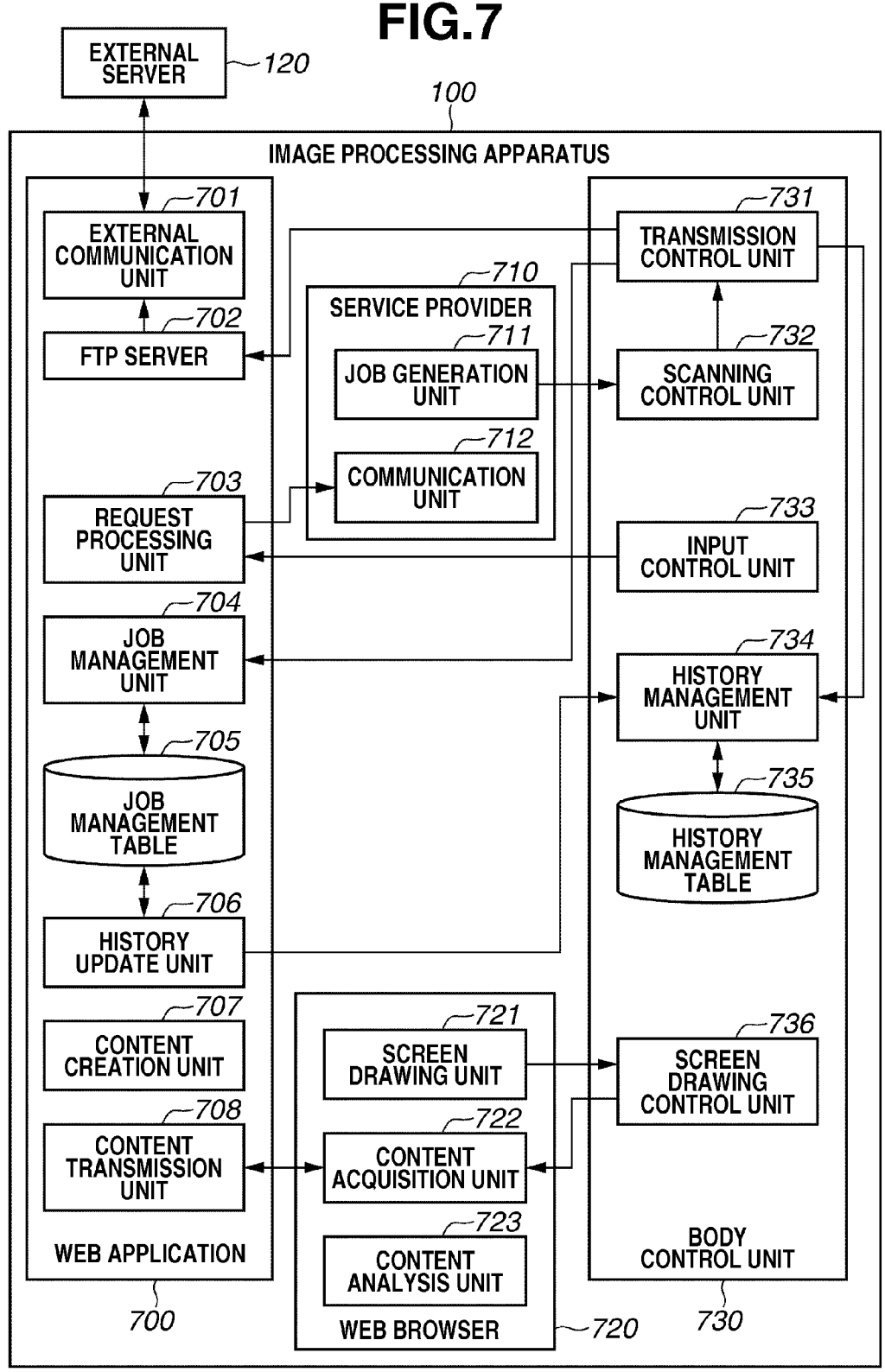

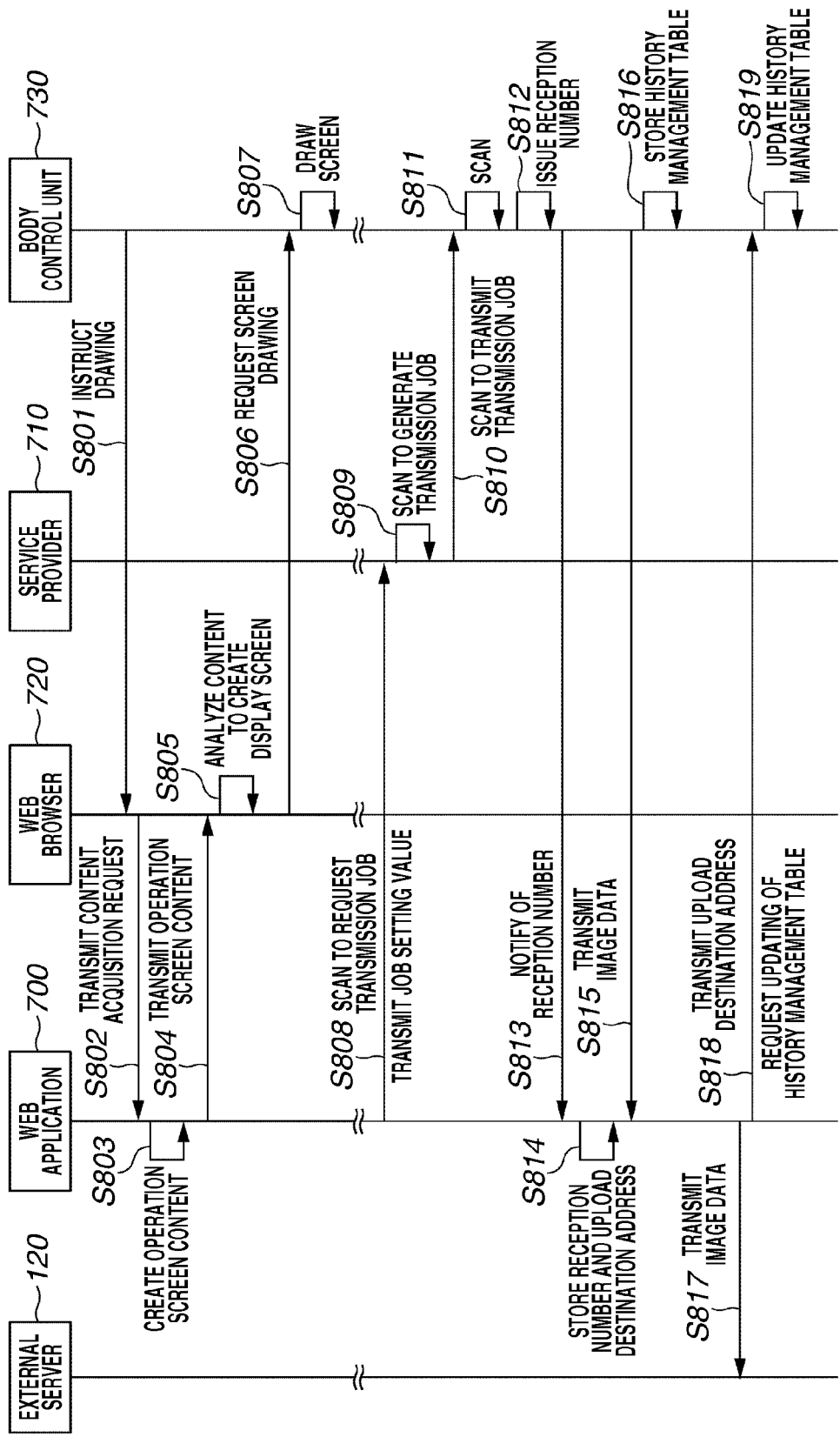

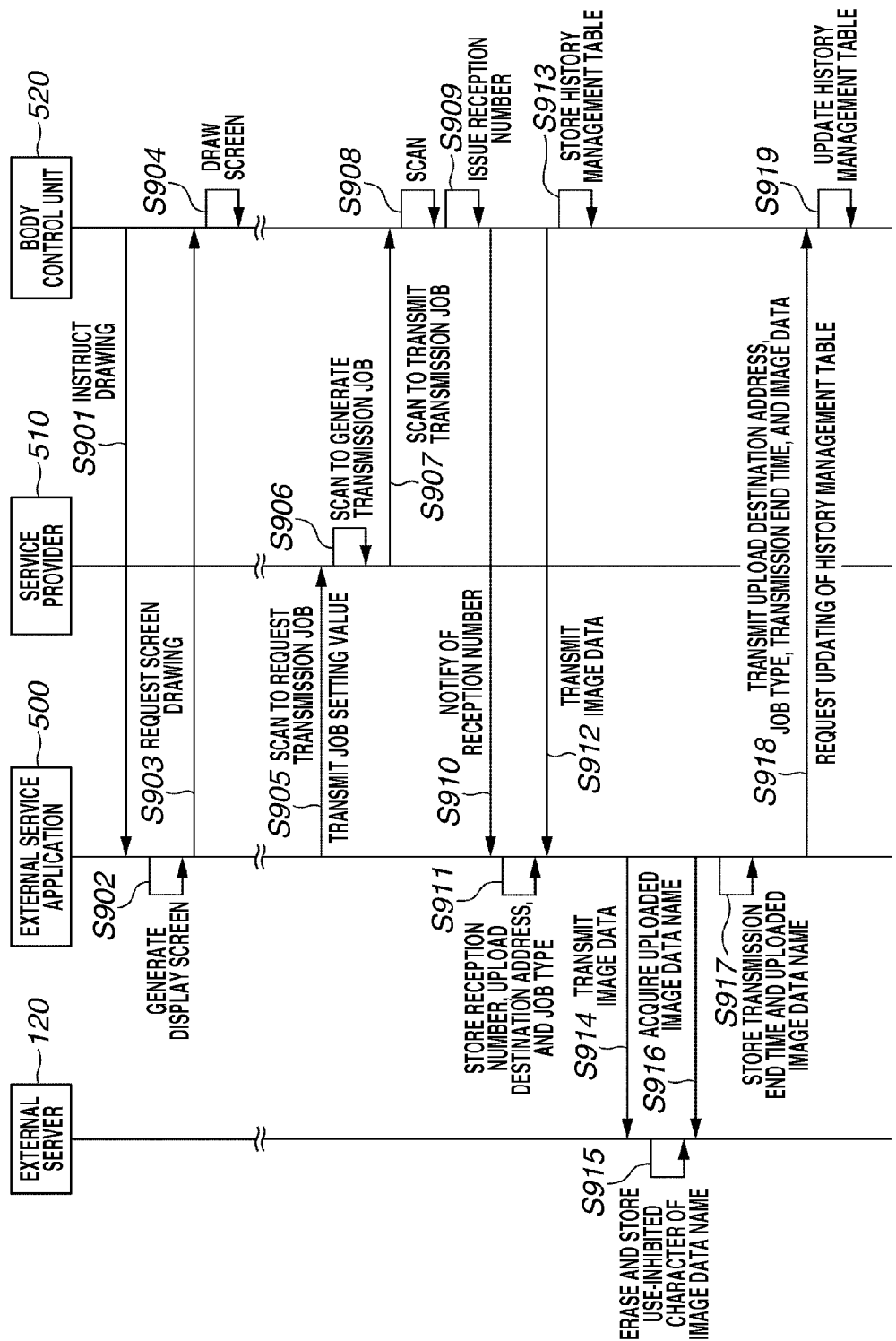

FIG.10A

```
STATUS CHECKING/CANCELLATION
RECEPTION NUMBER: 0003
RESULT:           OK

START TIME:       2010/01/01 0:00
    END TIME:         2010/01/01 0:01 ～1001
    SECTION ID:       -------
    JOB TYPE:         FTP ～1002
    COUNTER PARTY:    http://localhost/server.htm ～1003
    TRANSMISSION FILE NAME: sample_document.doc ～1004

```
STATUS CHECKING/CANCELLATION
RECEPTION NUMBER: 0003
RESULT:           OK

START TIME:       2010/01/01 0:00
    END TIME:         2010/01/01 0:03 ～1011
    SECTION ID:       -------
    JOB TYPE:         Send To Cloud ～1012
    COUNTER PARTY:    https://dosc.outsever.htm ～1013
    TRANSMISSION FILE NAME: sampledocument.doc ～1014

STATUS CHECKING/CANCELLATION

RECEPTION NUMBER: 0004
STATUS: BEING UPLOADED ~1401

| | |
|---|---|
| START TIME: | 2010/01/01 0:00 ~1402 |
| SECTION ID: | ------- |
| JOB TYPE: | Send To Cloud ~1403 |
| COUNTER PARTY: | https://dosc.outsever.htm ~1404 |
| TRANSMISSION FILE NAME: | sample_document.doc ~1405 |

STATUS CHECKING/CANCELLATION

RECEPTION NUMBER: 0003
RESULT: OK ~1411

| | |
|---|---|
| START TIME: | 2010/01/01 0:00 |
| END TIME: | 2010/01/01 0:03 |
| SECTION ID: | ------- |
| JOB TYPE: | Send To Cloud |
| COUNTER PARTY: | https://dosc.outsever.htm |
| TRANSMISSION FILE NAME: | sampledocument.doc |

▽ | 1/2 | △

OK

IMAGE PROCESSING APPARATUS, METHOD FOR CONTROLLING THE SAME, AND STORAGE MEDIUM FOR GENERATING IMAGE DATA BASED ON A READ DOCUMENT

BACKGROUND OF THE INVENTION

1. Field of the Invention

The present invention relates to an image processing apparatus, a method for controlling the same, and a storage medium.

2. Description of the Related Art

In recent years, in a network environment surrounding the image processing apparatus, a focus has been on a computer utility form particularly based on the Internet such as cloud computing. In the cloud computing, a user uses computer processing as services via a network. Particularly, in the Internet, various providers supply a variety of services, and the user can select a service according to his or her own utility form such as a business. Thus, in the image processing apparatus, providing solutions to improve user's business efficiency in cooperation with services from various service providers is important.

Conventionally, there has been a form in which services has been provided to the user in association of the image processing apparatus with an external server. Japanese Patent Application Laid-Open No. 2010-56770 discusses a method in which an image processing apparatus associates with a document management system and uploads data scanned by the image processing apparatus to the document management system.

However, this conventional configuration necessitates installation of a new program to associate with the external server, and hence mounting costs of the image processing apparatus increase.

The present invention is directed to an image processing apparatus that can utilize a scanning transmission function of a conventional image processing apparatus, and provide services to users in association with an external server while suppressing mounting costs of the image processing apparatus. The scanning transmission function reads a document placed on a platen of the image processing apparatus, generates image data, and transmits the generated image data to a designated server.

The present invention assumes that in the image processing apparatus for providing services to the users in association with the external server, the conventional scanning transmission function is utilized and the scanned image data is transmitted to the external server. According to the present invention, under such circumstances, even when the scanned image data is transmitted, the image processing apparatus manages appropriate transmission history.

SUMMARY OF THE INVENTION

According to an aspect of the present invention, an apparatus includes a generation unit configured to generate image data based on a document read via a scanner unit and a first transmission unit configured to transmit the generated image data to a designated destination. The apparatus includes a transmission server, an instruction unit configured to instruct, according to reception of an uploading request to upload the generated image data to an external server communicable with the apparatus, the first transmission unit to transmit the image data to the transmission server and a second transmission unit configured to acquire the generated image data, according to an instruction from the instruction unit, from the transmission server, and transmit the acquired image data to the external server.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a block diagram illustrating a software configuration of an image processing apparatus according to a second exemplary embodiment.

FIG. 8 is a flowchart illustrating an operation of the image processing system according to the second exemplary embodiment.

FIG. 9 is a flowchart illustrating an operation of an image processing system according to a third exemplary embodiment.

FIGS. 10A and 10B illustrate images displayed on a display unit 209 according to the third exemplary embodiment.

FIGS. 14A and 14B illustrate images displayed on an operation unit 209 according to the fifth exemplary embodiment.

DESCRIPTION OF THE EMBODIMENTS

Various exemplary embodiments, features, and aspects of the invention will be described in detail below with reference to the drawings.

Figure 4:
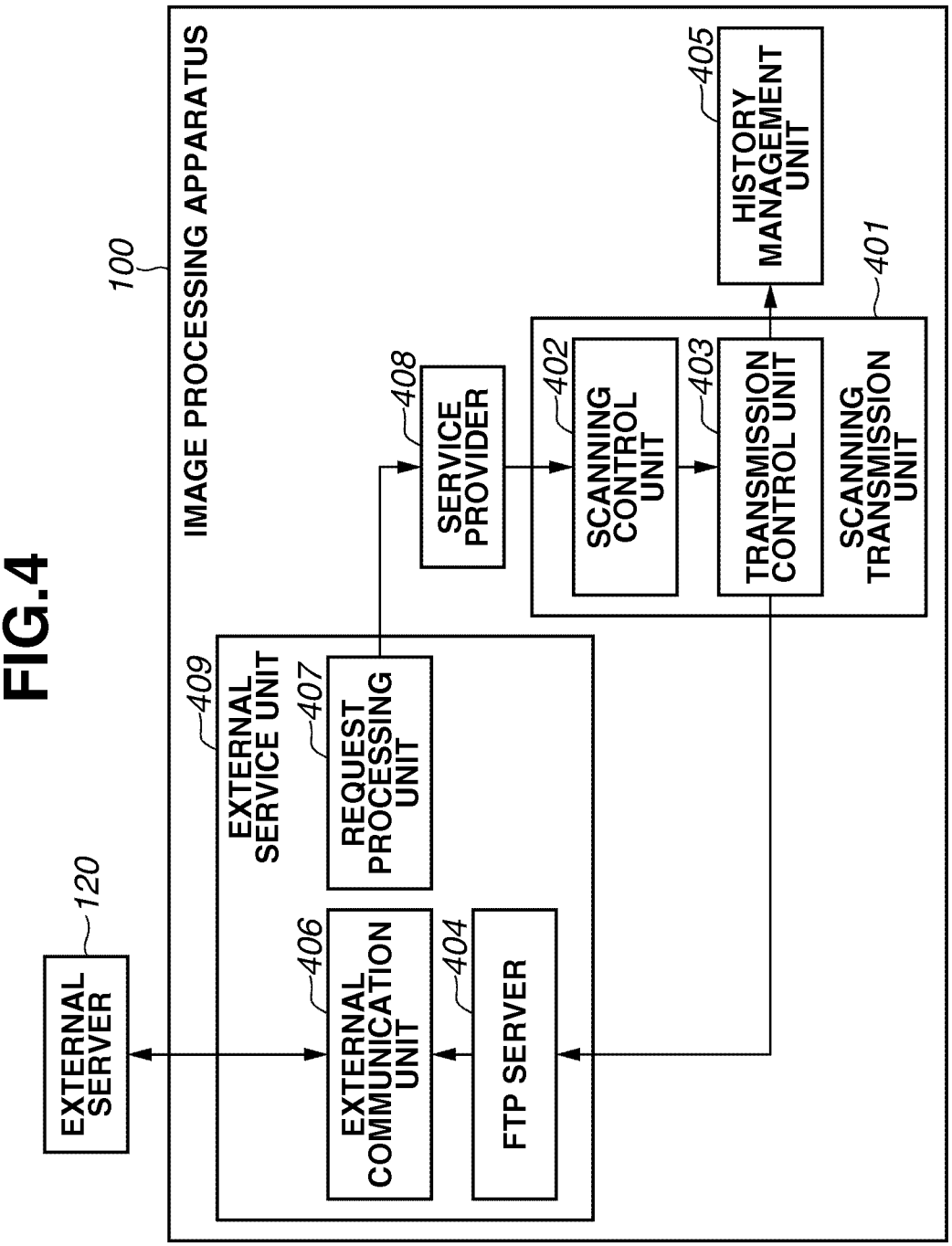
FIG. 4 is a block diagram illustrating a software configuration of an image processing apparatus in a conventional exemplary embodiment.

First, situations occurring when an external service application necessary for associating the conventional transmission function with the external server is simply installed in the image processing apparatus are described. As illustrated in FIG. 4, assume that an image processing apparatus is mounted with a scanning transmission unit 401 which is a function of the conventional image processing apparatus, a history management unit 405 which is also a function of the conventional image processing apparatus, and an external service unit 409.

In this case, a request processing unit 407 transmits an instruction of scanning transmission processing, and transmits an instruction to a service provider 408 for transmitting image data to a designated transmission destination. The service provider 408 generates a job to transmit it to the scanning transmission unit 401. A scanning control unit 402 performs scan processing based on the job. A transmission control unit 403 transmits the scanned image data to a file transfer protocol (FTP) server 404 of the external service unit 409 that is a designated destination. The FTP server 404 transmits the scanned image data to an external communication unit 406. The external communication unit 406 is a function achieved by a communication module for communicating data with an external server 120, and performs data communication according to a communication standard of the external server 120. The external communication unit 406 has a function of transmitting data to a directory of the external server 120 designated by a user. The external communication unit 406 uploads the image data received from the FTP server 404 to the external server 120. In this case, the history management unit 405 stores various pieces of job history information containing a uniform resource locator (URL) of a transmission destination to which the transmission control unit 403 of the scanning transmission unit 401 transmits the image data. Thus, in job history managed by the history management unit 405, a URL of a transmission server in the image processing apparatus, such as http://localhost/server.htm, is stored. In reality, the image data is uploaded to the external serves, and hence the URL of the external service may be displayed as a transmission address of the job history.

The scanning transmission function to achieve the scanning transmission is illustrated as one software configuration. However, scanning and transmission can be separated to be mounted as independent modules. Even with this configuration, the present invention can be applied, and thus the processing is referred to as a scanning transmission function.

A first exemplary embodiment of the present invention is described.

Figure 1:
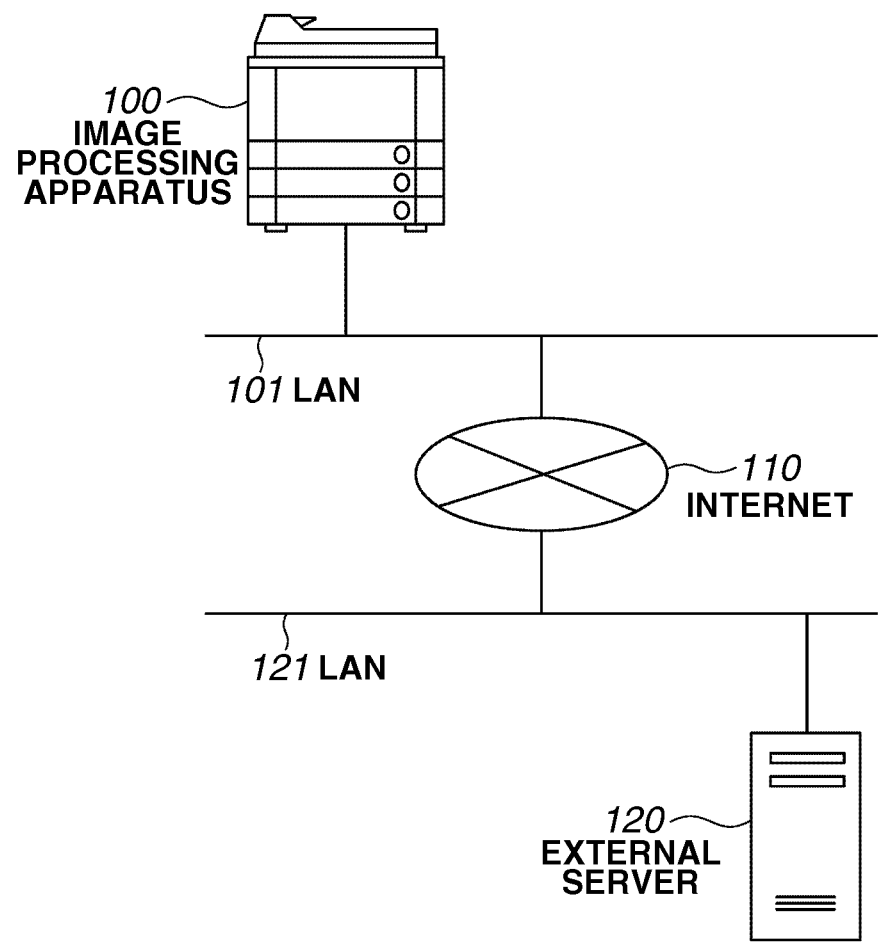
FIG. 1 illustrates an entire image processing system according to a first exemplary embodiment of the present invention.

A system configuration is described. FIG. 1 illustrates an entire image processing system according to the exemplary embodiment of the present invention. An image processing apparatus 100 is connected to the Internet 110 via a local area network (LAN) 101. An external server 120 that provides services in a cloud computing environment is connected to the Internet 110 via a LAN 121. The image processing apparatus 100 can communicate with the external server 120, and use the services provided from the external server 120. An example where one external server 120 provides a file management server is described. However, as another form, the external server 120 can include a plurality of services, and activate a plurality of virtual machines included in the group of servers to perform distributed processing.

Figure 2:
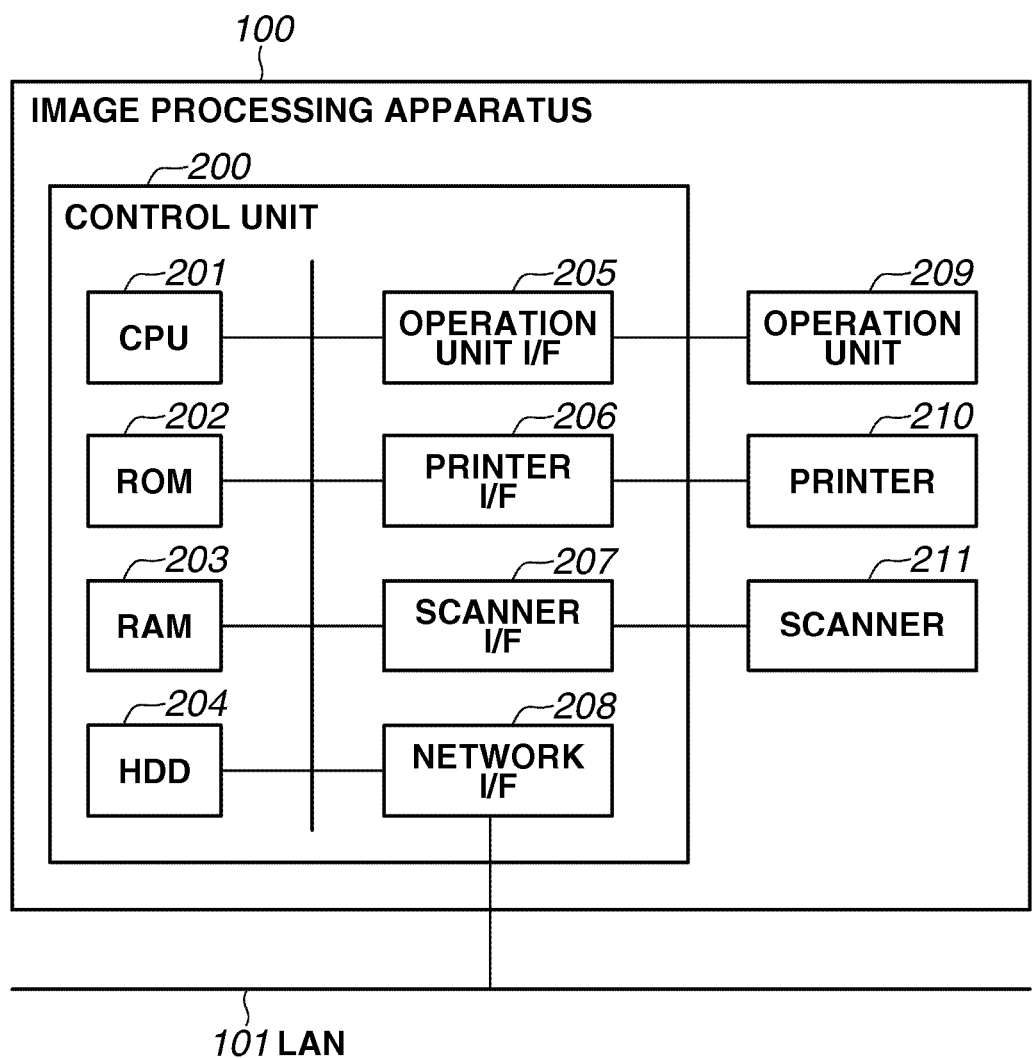
FIG. 2 is a block diagram illustrating a hardware configuration of an image processing apparatus according to the first exemplary embodiment.

A hardware configuration of the image processing apparatus is described. FIG. 2 is a block diagram illustrating a configuration of the image processing apparatus 100 according to the exemplary embodiment of the present invention. A control unit 200 including a central processing unit (CPU) 201 controls an overall operation of the image processing apparatus 100. The CPU 201 reads a control program stored in a read-only memory (ROM) 202 to perform various control operations such as reading control and transmission control. A random access memory (RAM) 203 is used as a main memory of the CPU 201 and as a temporary storage area such as a work area. A hard disk drive (HDD) 204 stores image data, various programs, or various information tables. An operation interface (I/F) 205 connects an operation unit 209 with the control unit 200. The operation unit 209 includes a liquid crystal display unit having a touch panel function and a keyboard.

A printer I/F 207 connects a printer 210 with the control unit 200. The control unit 200 transfers image data to be printed by the printer 210 via the printer I/F 207, and the printer 210 prints the image data on a recording medium. A scanner I/F 207 connects a scanner 211 with the control unit 200. The scanner 211 reads an image on a document to generate image data, and inputs the image data to the control unit 200 via the scanner I/F 207. A network I/F 208 connects the control unit 200 with the LAN 101. The network I/F 208 transmits the image data and information to an external apparatus on the LAN 101, and receives various pieces of information from the external apparatus on the LAN 101.

Figure 3:
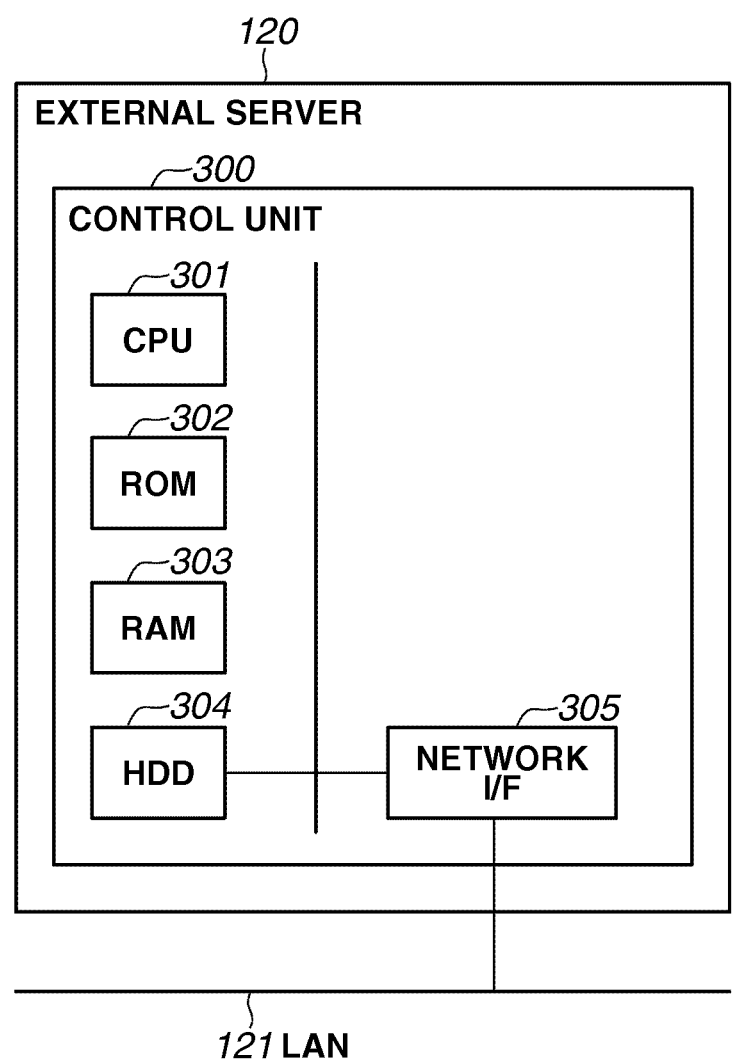
FIG. 3 is a block diagram illustrating a hardware configuration of an external server according to the first exemplary embodiment.

A hardware configuration of an external server is described. FIG. 3 is a block diagram illustrating a configuration of the external server 120 that provides external services according to the exemplary embodiment of the present invention. A control unit 300 including a CPU 301 controls an overall operation of the external server 120. The CPU 301 reads a control program stored in a ROM 302 to perform various control operations. A RAM 303 is used as a main memory of the CPU 301 and as a temporary storage area such as a work area. A HDD 304 stores image data, various programs, and various information tables described below. A network I/F 305 connects the control unit 300 with the LAN 121. The network I/F 305 transmits and receives various pieces of information to and from another apparatus on the LAN 121.

Figure 5:
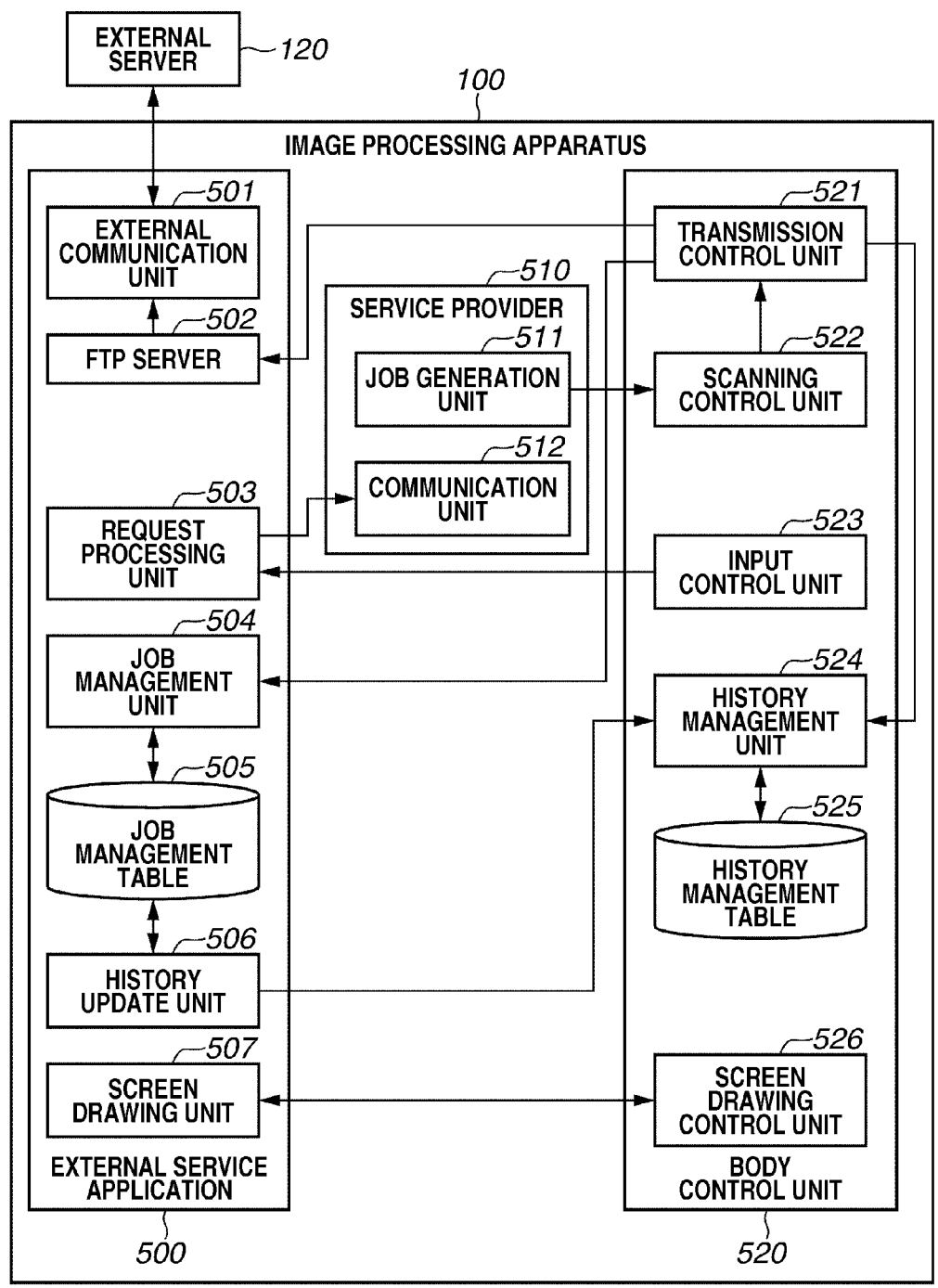
FIG. 5 is a block diagram illustrating a software configuration of the image processing apparatus according to the first exemplary embodiment.

A software configuration of the image processing apparatus is described. FIG. 5 illustrates the software configuration of the image processing apparatus according to the first exemplary embodiment. Functions illustrated in FIG. 5 are achieved by reading, by the CPU 201 in the image processing apparatus 100, the control program stored in the ROM 202 or the HDD 204 to execute it.

The image processing apparatus 100 includes functions of an external service application 500, a service provider 510, and a body control unit 520. It is assumed that the functions are respectively achieved by executing different programs. The external service application 500 communicates with the external server 120 to upload the image data to the external server 120, and provides an operation display screen to the body control unit 520. The external service application 500 includes an external communication unit 501, a FTP server 502, a request processing unit 503, a job management unit 504, a history update unit 506, and a screen drawing unit 507.

The external communication unit 501 communicates with the external server 120 via the Internet 110 to upload the image data received by the FTP server 502 to the external server 120. The external communication unit 501 is achieved by a communication module in which a communication protocol is installed to enable communication with the external server 120. The FTP server 502 receives the image data transmitted from a transmission control unit 521 of the body control unit 520. The FTP server 502 then transmits the received image data to the external communication unit 501. The external communication unit 501 corresponds to a second transmission unit.

The request processing unit 503 receives an input signal from an input control unit 523 of the body control unit 520, and requests a job to a communication unit 512 of the service provider 510. In this case, the request processing unit 503 transmits job setting values regarding a name to be given to the image date acquired by scanning, scanning resolution, and a URL of the FTP server 502 that is transmission destination of the image data. The request processing unit 503 transmits the URL of the uploading destination of the image data to the external communication unit 501 and the job management unit 504.

The job management unit 504 receives a reception number from the transmission control unit 521 of the body control unit 520 to store it in a job management table 505. The job management unit 504 associates the URL of the external sever 120 that is an uploading destination of the image data with the reception number to store it in the job management table 505. The reception number is described below. The job management table 505 is stored in the RAM 203 or the HDD 204.

The history update unit 506 requests the history management unit 524 of the body control unit 520 to retrieve job management information associated with the reception number from the job management table 505, transmit the retrieving result, and rewrite a history management table 525. The screen drawing unit 507 generates a screen to be displayed on the operation unit 209 to transmit it to a screen rendering control unit 526 of the body control unit 520.

The service provider 510 includes the communication unit 512 and a job generation unit 511. The communication unit 512 receives a processing request from the request processing unit 503 of the external service application 500. The job generation unit 511 generates a job to execute the request received by the communication unit 512. In this case, the job generation unit 511 reflects a job setting value received by the communication unit 512 to generate the job. The job generation unit 511 then transmits the generated job to a scanning control unit 522 of the body control unit 520.

The body control unit 520 performs a scanning operation as instructed by the service provider 510 to transmit the image data to the external service application 500. The body control unit 520 displays an operation display screen supplied from the external service application 500, or updates the history management table 515 in response to a request from the external service application 500. The body control unit 520 includes the scanning control unit 522, the transmission control unit 521, the input control unit 523, the history management unit 524, and the screen drawing control unit 526.

The scanning control unit 522 receives the job generated by the job generation unit 511 of the service provider 510, and controls the scanner 211 to execute scanning. The scanning control unit 522 transmits image data acquired as a result of the scanning to the transmission control unit 521.

The transmission control unit 521 receives the image data from the scanning control unit 522 to transmit it to the FTP server 502 of the external service application 500. The transmission control unit 521 issues a reception number associated with the job transmitted to the FTP server 502. Reception numbers are given unique numerals corresponding to jobs, and these numerals are sequential in execution order of the jobs. Based on the reception number, information is retrieved from the job management table 505 to be transmitted or the history management table 525 is updated. After issuing the reception number, the transmission control unit 521 transmits the reception number to the job management unit 504 of the external service application 500. The transmission control unit 521 instructs the history management unit 524 to store job information when the transmission control unit 521 transmits the image data acquired by the scanning to the FTP server 502. The transmission control unit 521 corresponds to a first transmission unit.

The input control unit 523 transmits an input signal to the request processing unit 503 of the external service application 500 when a user's instruction input from the operation unit 209 is a selection instruction to the external service application 500.

The history management unit 524 associates the reception number with job information such as a transmission destination address, start time, a job type, and a transmission file name to store it in the history management table 525. The history management unit 524 updates, in response to an instruction from the history update unit 506 of the external service application 500, the job information associated with the received reception number. The history management table 525 is stored in the RAM 203 or the HDD 204.

The history management table 525 stores the reception number and its related job information, and the job information contains the transmission destination address. In the conventional art, a URL of the FTP server 502 that is a transmission destination of the transmission control unit 521 is stored in the transmission destination address of the history management table 525, and the job information (URL) is provided as job history to the user. In other words, when the user gives an instruction to consult transmission history of the transmission control unit 521 wishing to consult the job information, job history is displayed, and then the URL of the FTP server 502 is displayed. This creates a possibility that the user may erroneously recognize that the transmission destination is a server in the image processing apparatus. According to the present invention, in response to an instruction from the history update unit 506 of the external service unit 500, the history management unit 524 rewrites the transmission destination address of the history management table 525 with the URL of the external server 120 stored in the job management table 505. When the job history is displayed, the URL of the external server 120 that is an actual image uploading destination is displayed. As a result, user's erroneous recognition can be prevented.

The screen drawing control unit 526 receives an instruction from the input control unit 523, and displays a screen on the operation unit 209 based on the instruction. The screen drawing control unit 526 gives a drawing instruction to the screen drawing unit 507 of the external service unit 500, receives a generated display screen, and displays the screen on the operation unit 209.

Figure 6:
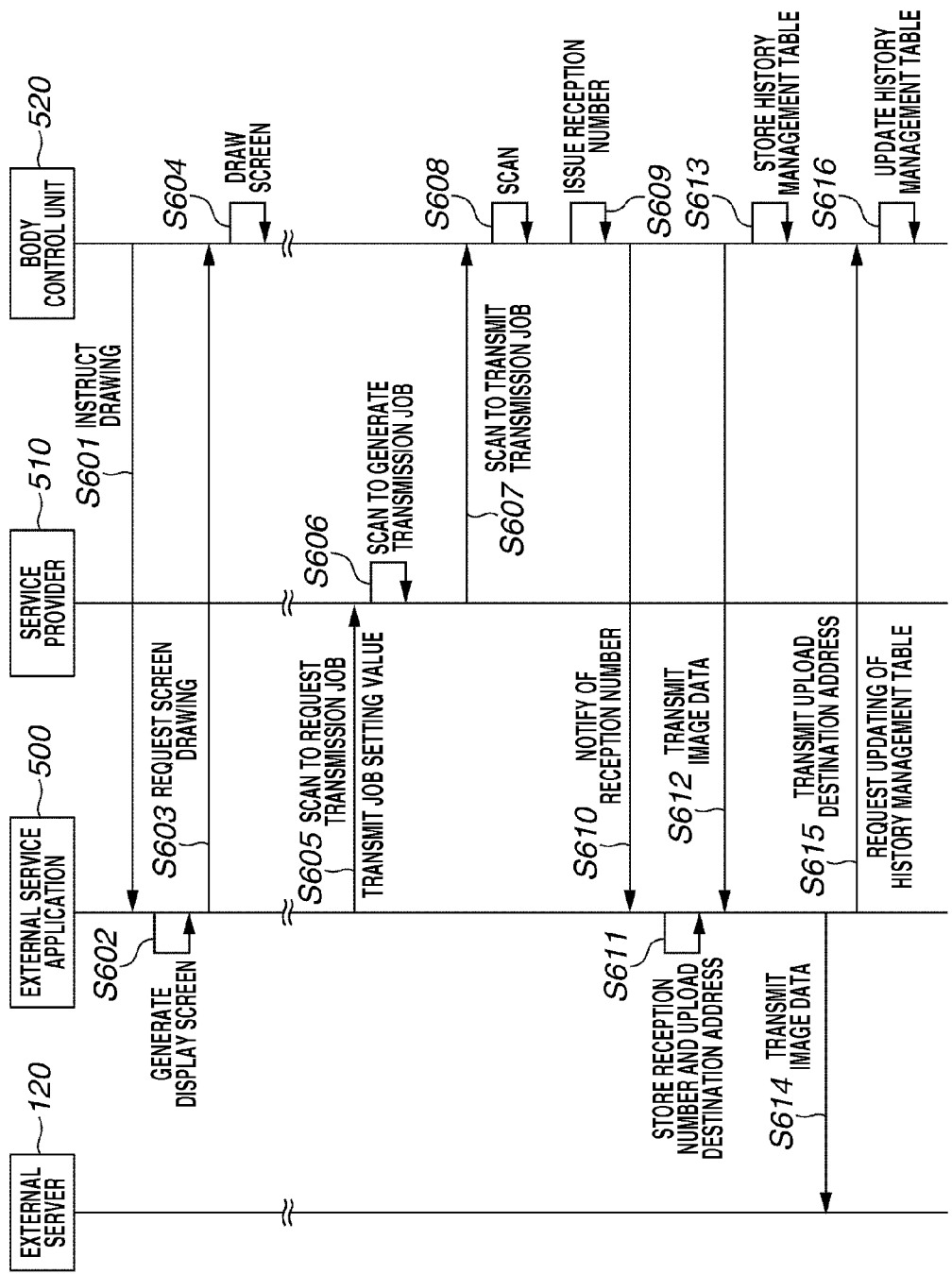
FIG. 6 is a flowchart illustrating an operation of the image processing system according to the first exemplary embodiment.

Characteristic processing of the first exemplary embodiment is described. FIG. 6 is a flowchart illustrating a series of processes executed to update the transmission destination address of the history management table 525 in response to an instruction from the history update unit 506 of the external service application 500 according to the first exemplary embodiment of the present invention. Each operation of the processing flow illustrated in FIG. 6 is executed by a function achieved by executing each control program by the CPU 201 of the image processing apparatus 100 and the CPU 301 of the external server 120 respectively.

In step S601, the screen drawing control unit 526 of the body control unit 520 instructs the screen drawing unit 507 of the external service application 500 to draw a screen. In step S602, the screen drawing unit 507 of the external service application 500 generates a screen to be displayed on the operation unit 209. In step S603, the screen drawing unit 507 of the external service application 500 transmits the screen to the screen drawing control unit 526 of the body control unit 520. In step S604, the screen rendering control unit 526 of the body control unit 520 displays the received display screen on the operation unit 209.

In step S605, the request processing unit 503 of the external service application 500 requests the communication unit 512 of the service provider 510 to perform a scanning job to transmit data to the external server 120. This job is requested in response to a user's request of uploading image data acquired by scanning to the external server 120 made via the display screen of the operation unit 209. In this case, the request processing unit 503 also transmits job setting values such as a name given to the image data acquired by the scanning and scanning resolution. The user input these setting values via the screen. The request processing unit 503 transmits an address of the FTP server 502 to the service provider 510. In step S606, the job generation unit 511 of the service provider 510 generates a job to execute the scanning and transmitting job request received by the communication unit 512. In this case, the job generation unit 511 generates the job reflecting the job setting values received by the communication unit 512. In step S607, the job generation unit 511 of the service provider 510 transmits the generated job and the address of the FTP server 502 to the scanning control unit 522 of the body control unit 520.

In step S608, the scanning control unit 522 of the body control unit 520 receives the job generated by the job generation unit 511 of the service provider 510, and controls the scanner 211 to execute scanning. The scanning control unit 522 acquires image data as a result of the scanning, and transmits it to the transmission control unit 521. In step S609, the transmission control unit 521 issues a reception number corresponding to the received job. Reception numbers are given unique numerals corresponding to jobs, and these numerals are sequential in execution order of the jobs. In step S610, the transmission control unit 521 transmits the received reception number to the job management unit 504 of the external service application 500.

In step S611, the job management unit 504 of the external service application 500 stores the reception number received in step S610 in the job management table 505. The job management unit 504 stores the URL of the external server 120 that is an uploading destination of the image data received by the request processing unit 503 from the input control unit 523 in the job management table 505 in association with the reception number.

In step S612, the transmission control unit 521 of the body control unit 520 transmits the image data received in step S608 to the FTP server 502 of the external service application 500. In step S613, the history management unit 524 of the body control unit 520 associates the reception number issued in step S609 with job information such as a transmission destination address, start time, and a job type to store it in the history management table 525. In this case, in the transmission destination address of the history management table 525, http://localhost/server.htm that is an address of the FTP server 502 of the external service application 500 is stored.

In step S614, the external communication unit 501 of the external service application 500 transmits the image data received in step S505 to transmit it to the external server 120 via the Internet 110. The transmission destination address is the URL received by the request processing unit 503 from the input control unit 523, and the external communication unit 501 receives the URL from the request processing unit 503. In step S615, the history update unit 506 of the external service application 500 retrieves the URL of the external sever 120 that is the uploading destination address from the job management table 505 based on the reception number to transmit it to the body control unit 520. Then, the history update unit 506 requests the history management unit 524 to update the history management table 525.

In step S616, the history management unit 524 of the body control unit 520 rewrites the transmission destination address associated with the reception number with the uploading destination address received in step S615. In other words, http://localhost//server.htm that is the address of the FTP server 502 stored in the transmission destination address of the history management table 525 is rewritten with the URL of the external server 120. Thus, when the job history is displayed, the URL of the external server 120 that is the actual image uploading destination is displayed. As a result, user's erroneous recognition can be prevented. The former history corresponds to a first history, and the latter replaced history corresponds to a second history.

According to the present invention, when the image data is transmitted to the server in the image processing apparatus, and then transmitted to the external server, the address of the external server can be displayed in the transmission destination address of the job history rather than the address of the server in the image processing apparatus. As a result, user's erroneous recognition that the transmission destination is the server in the image processing apparatus can be prevented, and operability can be improved.

Next, a second exemplary embodiment of the present invention is described. The second exemplary embodiment is directed to a case of using a web browser and a web application in place of the external service application 500. Only differences from the first exemplary embodiment are described.

A software configuration of an image processing apparatus is described. FIG. 7 illustrates a software configuration of an entire system that includes the image processing apparatus according to the second exemplary embodiment. Function units illustrated in FIG. 7 are achieved by reading and executing a control program stored in a ROM 202 or a HDD 204 by a CPU 201 in the image processing apparatus 100.

The image processing apparatus 100 includes a web application 700, a service provider 710, a web browser 720, and a body control unit 730. The service provider 710 and the body control unit 730 are respectively similar in configuration to the service provider 510 and the body control unit 520 illustrated in FIG. 5, and thus description thereof is omitted.

The web application 700 communicates with an external server 120 to upload image data to the external server 120 and provide an operation display screen to the web browser 720. The web application 700 includes an external communication unit 701, a FTP server 702, a request processing unit 703, a job management unit 704, a history update unit 706, a content creation unit 707, and a content transmission unit 708. The external communication unit 701, the FTP server 702, the request processing unit 703, the job management unit 704, and the history update unit 706 are similar in configuration to the external communication unit 501, the FTP server 502, the request processing unit 503, the job management unit 504, and the history update unit 506, and thus description thereof is omitted.

The content creation unit 707 analyzes a response message received by the external communication unit 701 from the external server 120 to create operation screen contents to be transmitted to the web browser 720. The content transmission unit 708 transmits the operation screen contents created by the content creation unit 707 in response to a request from the web browser 720.

The web browser 720 acquires the operation screen contents from the web application 700 to display them on an operation unit 209, and transmits a request to the web application 700 based on a user's instruction input via the operation unit 209. The web browser 720 includes a content acquisition unit 722, a content analysis unit 723, and a screen drawing unit 721. The content acquisition unit 722 transmits a content acquisition request to the content transmission unit 708 of the web application 700, and receives a response transmitted from the content transmission unit 708 as a content.

The content analysis unit 723 analyzes the content acquired by the content acquisition unit 722 to create a screen to be displayed on the operation unit 209. The screen drawing unit 721 displays the screen created by the content analysis unit 723 on the operation unit 209. In reality, when a drawing instruction is received from a screen drawing control unit 736 of the body control unit 730, the screen drawing unit 721 transmits a screen drawing request to the operation unit 209.

Characteristic processing of the second exemplary embodiment is described. FIG. 8 is a flowchart illustrating a series of processes where the web browser 720 acquires the operation screen contents from the web application 700 to display them on the operation unit 209 according to the second exemplary embodiment of the present invention. Each operation in the flowchart illustrated in FIG. 8 is achieved by executing each control program by the CPU 120 of the image processing apparatus 100 and a CPU 301 of the external server 120 respectively.

Steps S808 to S819 are similar to steps S605 to S616, and thus description thereof is omitted. In step S801, a screen drawing control unit 736 of the body control unit 730 issues a drawing instruction to the web browser 720 based on a user's instruction. In step S802, the content acquisition unit 722 of the web browser 720 transmits a content acquisition request to upload image data to the external server 120 to the web application 700. In step S803, the content creation unit 707 of the web application 700 creates operation screen contents to upload the image data. In step S804, the content transmission unit 708 of the web application 700 transmits the operation screen contents created in step S803 to the content acquisition unit 722 of the web browser 720.

In step S805, the content analysis unit 723 of the web browser 720 analyzes the operation screen contents received in step S804 to create a display screen. In step S806, the screen drawing unit 721 of the web browser 720 transmits the display screen created in step S805 to the screen drawing control unit 736 of the body control unit 730 to request screen rendering. In step S807, the screen drawing control unit 736 of the body control unit 730 displays the display screen received in step S806 on the operation unit 209.

According to the present invention, even when the web browser and the web application are used, an address of the external server can be displayed as an address of a job history transmission destination.

Next, a third exemplary embodiment of the present invention is described. The third exemplary embodiment is directed to a case of updating information in addition to an address of a job history transmission destination. Only differences from the first exemplary embodiment are described.

Characteristic processing of the third exemplary embodiment is described. FIG. 9 is a flowchart illustrating a series of processes where an external service application 500 updates end time, a job type, and a transmission image data name of a history management table 525 according to the third exemplary embodiment of the present invention. Each operation of the flowchart illustrated in FIG. 9 is achieved by executing each control program by a CPU 201 of an image processing apparatus 100 and a CPU 301 of an external server 120 respectively.

Steps S901 to S910, and steps S912 to S914 are similar to steps S601 to S610 and steps S612 to S614 illustrated in FIG. 6, and thus description thereof is omitted. In step S911, a job management unit 504 of the external service application 500 stores a reception number received in step S910 in a job management table 505. The job management unit 504 associates a URL of an external server 120 that is an uploading destination of the image data with the reception number to store it in the job management table 505. The job management unit 504 associates a job type processed by the external service application 500 with the reception number to store it in the job management table 505. For example, in the embodiment, a job is to transmit the image data to the external server 120 on a cloud, and hence a job type of "Send to Cloud" is transmitted. When the image data is transmitted to a FTP server 502, the external service application 500 can determine the job type to be "Send to Cloud".

In step S915, when a use-inhibited character is used for a name of the image data received in step S914, the external server 120 deletes the character, and changes the image data name to store it in a HDD 304. For example, assume that the received image data name is "sample_document.doc", and storage of the image data using "_" is inhibited in the external server 120. In this case, the external server 120 deletes "_" of the image data name to change the name to "sampledocument.doc", and stores it in the HDD 304. Information on characters inhibited by the external server is stored beforehand in the image processing apparatus 100.

In step S916, an external communication unit 501 of the external service application 500 acquires the image data name changed in step S901 and stored in the HDD 304. For example, in the embodiment, the external communication unit 501 acquires the name "sampledocument.doc" when the external server 120 changes the name "sampe_document.doc" of the transmitted data. The image processing apparatus can employ a configuration where the external service application 500 understands an inhibited character before the image data is transmitted to the external service application 500, and a file name is changed to be transmitted. In this case, step S916 can be omitted.

In step S917, completion time of transmission of the image data to the external server 120 is associated with the reception number to be stored in the job management table 505. The image data name acquired in step S916 is associated with the reception number to be stored in the job management table 505. This transmission time is time of transmitting the image data from the external communication unit 501 to the external server 120, not time of transmitting the image data from a transmission control unit 521 to the FTP server 502.

In step S918, a history update unit 506 of the external service application 500 retrieves, based on the reception number, an uploading destination address, a job type, transmission completion time, and the image data name from the job management table 505, and transmits them to the body control unit 520. Then, the history update unit 506 requests a history management unit 524 to update the history management table 525.

In step S919, the history management unit 524 of the body control unit 520 rewrites the transmission destination address, the job type, the transmission completion time, and the image data name associated with the reception number with the information received in step S918. In other words, the history management unit 524 rewrites the transmission destination address with a URL of the external sever 120, the job type with "Send to Cloud", the transmission completion time with the time stored in step S917, and the image data name with "sampledocument.doc".

FIG. 10A illustrates a conventional job history screen displayed on the operation unit 209 by a screen drawing control unit 526 of the body control unit 520. End time 1001, a job type 1002, a counter party 1003, and a transmission file name 1004 are all stored in step S913, and are history when the transmission of the image data to the FTP server 502 is completed in step S912. In reality, therefore, while a job is to upload the image data to the external server 120, there is a possibility that a user may erroneously recognize that the job is to transmit the image data to the FTP server 502. A screen of this job history is displayed until the external communication unit 501 completes transmission of the image data to the external server 120.

FIG. 10B illustrates a job history screen displayed on the operation unit 209 by the screen drawing control unit 526 of the body control unit 520. End time 1011, a job type 1012, a counter party 1013, and a transmission file name 1014 are all acquired by transmitting information of the job management table 505 in step S918 and updating it in step S919. In other words, the end time 1011 is uploading completion time of the image data, the job type 1012 is a job name when the image data is uploaded, the counter party 1013 is a URL of an uploading destination, and the transmission file name 1014 is an image data name during uploading. Thus, since the data becomes history at the completion time of uploading the image data in the external server 120, user's erroneous recognition can be prevented to improve operability.

According to the present exemplary embodiment, the end time and the job type are updated. However, history of other jobs can be updated.

According to the present invention, for history other than the transmission address of the job history, history when the image data is transmitted to the external server can be reflected. As a result, the history when the image data is transmitted to the external server can be correctly indicated to the user.

Next, a fourth exemplary embodiment of the present invention is described. The fourth exemplary embodiment is directed to a case where while a history management table 525 is not stored when transmission of image data to a FTP server 502 is completed, the history management table 525 is stored for the first time when uploading of the image data in the external server 120 is completed. Only differences from the first exemplary embodiment are described.

Figure 11:
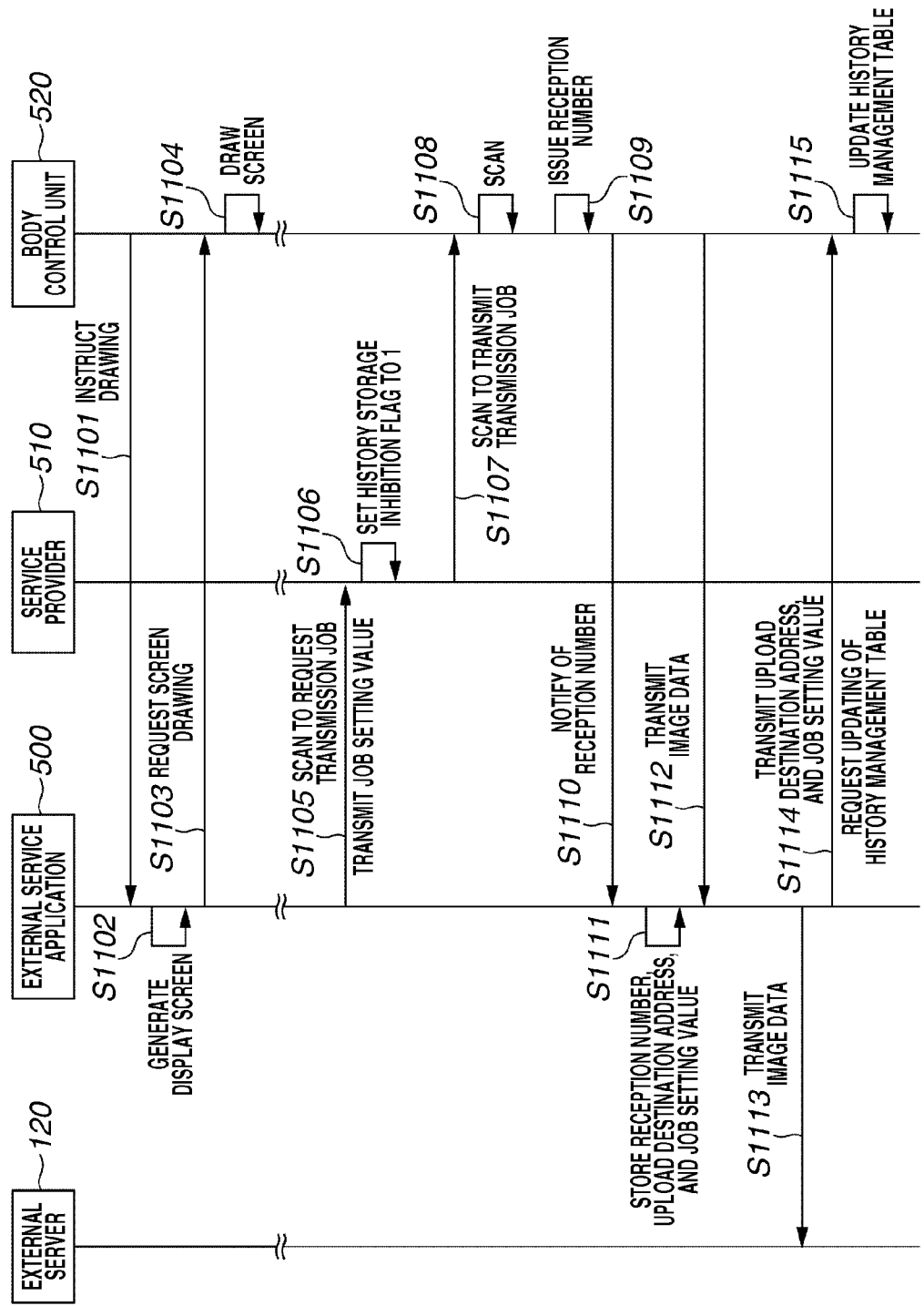
FIG. 11 is a flowchart illustrating an operation of an image processing system according to a fourth exemplary embodiment.

Characteristic processing of the fourth exemplary embodiment is described. FIG. 11 is a flowchart illustrating a series of processes where the history management table 525 is stored for the first time when uploading of the image data in the external server 120 is completed according to the fourth exemplary embodiment of the present invention. Each operation of the flowchart illustrated in FIG. 11 is achieved by executing each control program by a CPU 201 of an image processing apparatus 100 and a CPU 301 of an external server 120 respectively. Steps S1101 to S1105, steps S1107 to S1110, and step S1113 are similar to steps S601 to S605, steps S607 to S610, and step S614, and thus description thereof is omitted.

In step S1106, a job generation unit 511 of a service provider 510 generates a job to execute a request of a scanning transmission job received by a communication unit 512. In this case, the job generation unit 511 generates the job by reflecting job setting values received by the communication unit 512. To prevent storage of a history management table 525 at the completion time of transmission of image data to a FTP server 502, a history storage inhibition flag is changed from 0 to 1.

In step S1111, a job management unit 504 of an external service application 500 stores a reception number received in step S1110 in a job management table 505. The job management table 504 associates a URL of the external server 120 that is an uploading destination of the image data with the reception number to store it in the job management table 505. The job management unit 504 associates the job setting values transmitted to the communication unit 512 of the service provider 510 in step S1105 to store them in the job management table 505.

In step S1112, a transmission control unit 521 of a body control unit 520 transmits the image data received in step S608 to the FTP server 502 of the external service application 500. Then, while the job information is stored in the history management table 525 in the first exemplary embodiment, a history management unit 524 of the body control unit 520 checks the history storage inhibition flag, and does not store a history management table 525 when the history storage inhibition flag is 1.

In step S1114, a history update unit 506 of the external service application 500 retrieves an uploading destination address stored in step S1111 and other job setting values from the job management table 505 based on the reception number to transmit them to the body control unit 520. Then, the history update unit 506 requests the history management unit 524 to update the history management table 525.

In step S1115, the history management unit 524 of the body control unit 520 stores a transmission destination address and other job setting values associated with the reception number in the history management table 525.

In the first exemplary embodiment, when the job history is displayed before transmission of the image data to the FTP server 502 is completed and uploading of the image data to the external server 120 is completed, the URL of the FTP server 502 is displayed in the transmission destination address during this period. In the present exemplary embodiment, the history management table 525 is stored for the first time when uploading of the image data to the external server 120 is completed. Thus, user's erroneous recognition can be prevented.

According to the present invention, when the image data is transmitted to the server in the image processing apparatus, and then transmitted to the external server, the job history is displayed for the first time when uploading of the image data in the external server is completed. This prevents, immediately after transmission of the image data to the server in the image processing apparatus is completed, a user who views the job history from erroneously recognizing that the transmission destination is the server in the image processing apparatus. As a result, operability can be improved.

Next, a fifth exemplary embodiment of the present invention is described. The fifth exemplary embodiment is directed to a case where information on ongoing job execution is stored when transmission of image data to a FTP server 1202 is completed, and a job is stored for the first time in job history when uploading of the image data in an external server 120 is completed. Only differences from the first exemplary embodiment are described.

Figure 12:
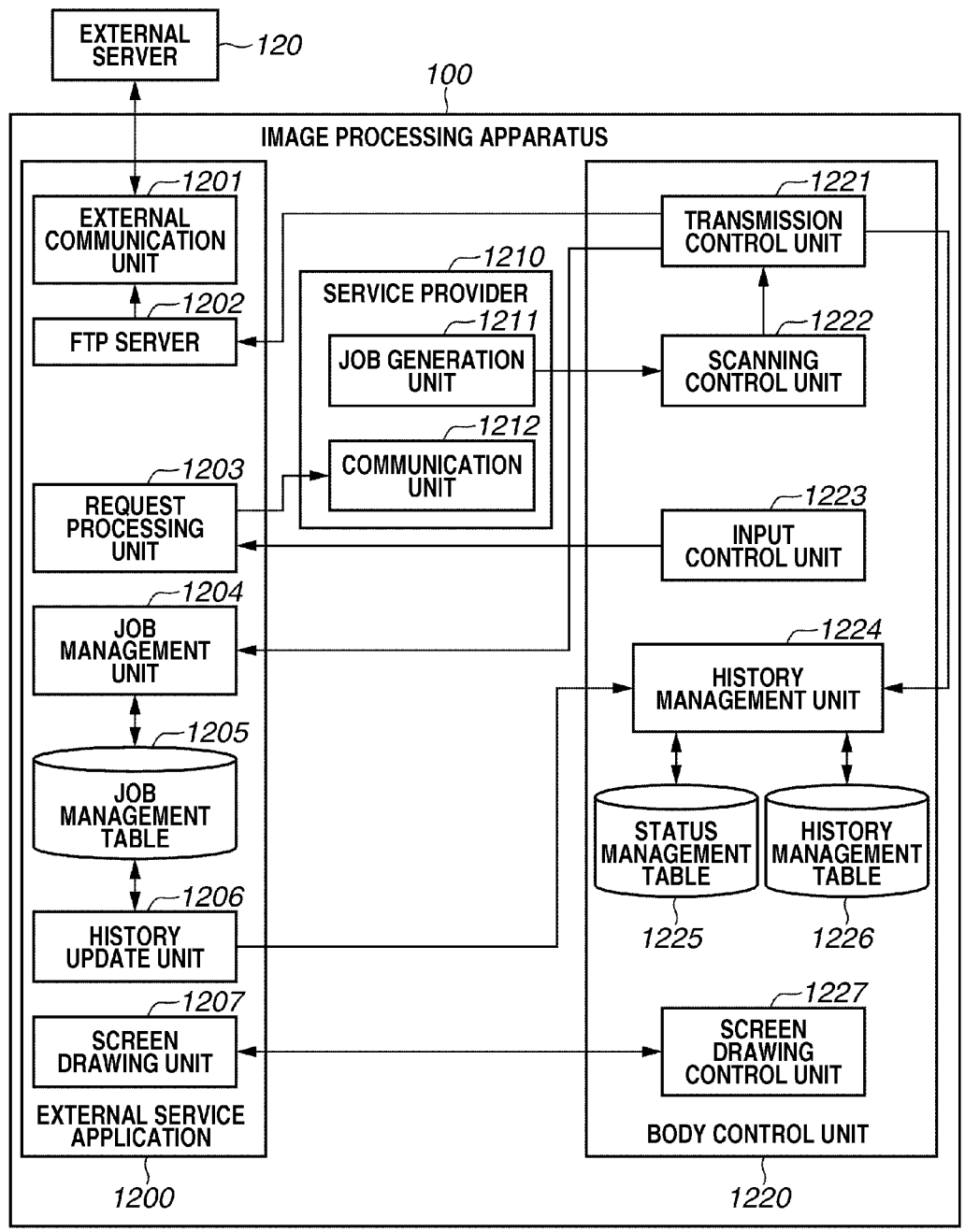
FIG. 12 is a block diagram illustrating a software configuration of an image processing apparatus according to a fifth exemplary embodiment.

A software configuration of an image processing apparatus is described. FIG. 12 illustrates a software configuration of an entire system that includes the image processing apparatus according to the fifth exemplary embodiment. Function units illustrated in FIG. 12 are achieved by reading and executing a control program stored in a ROM 202 or a HDD 204 by a CPU 201 in the image processing apparatus 100.

An external service application 1200 and a service provider 1210 are similar in content to the external service application 500 and the service provider 510 according to the first exemplary embodiment, and thus description thereof is omitted. A transmission control unit 1221, a scanning control unit 1222, an input control unit 1223, and a screen drawing control unit 1227 of a body control unit 1220 are similar in content to the transmission control unit 521, the scanning control unit 522, the input control unit 523, and the screen drawing control unit 526 illustrated in FIG. 5, and thus description thereof is omitted.

A history management unit 1224 associates a transmission destination address, start time, a job type, and a transmission file name with a reception number to store them in a status management table 1225 when a job is not yet completed. When the job is completed, the history management unit 1224 stores the reception number and the job information in a history management table 1226.

The status management table 1225 and the history management table 1226 are stored in a RAM 203 or the HDD 204. In FIG. 12, a job management table 1205, the status management table 1225, and the history management table 1226 are stored in different memories. However, the tables can be stored in the same memory. Necessary information is on which information each table indicates. The status management table 1225 stores information on an ongoing job, and a user can check a job status on a screen during job execution. The history management table 1226 stores history of a completed job, and the user can check job history after job completion on the screen.

Figure 13:
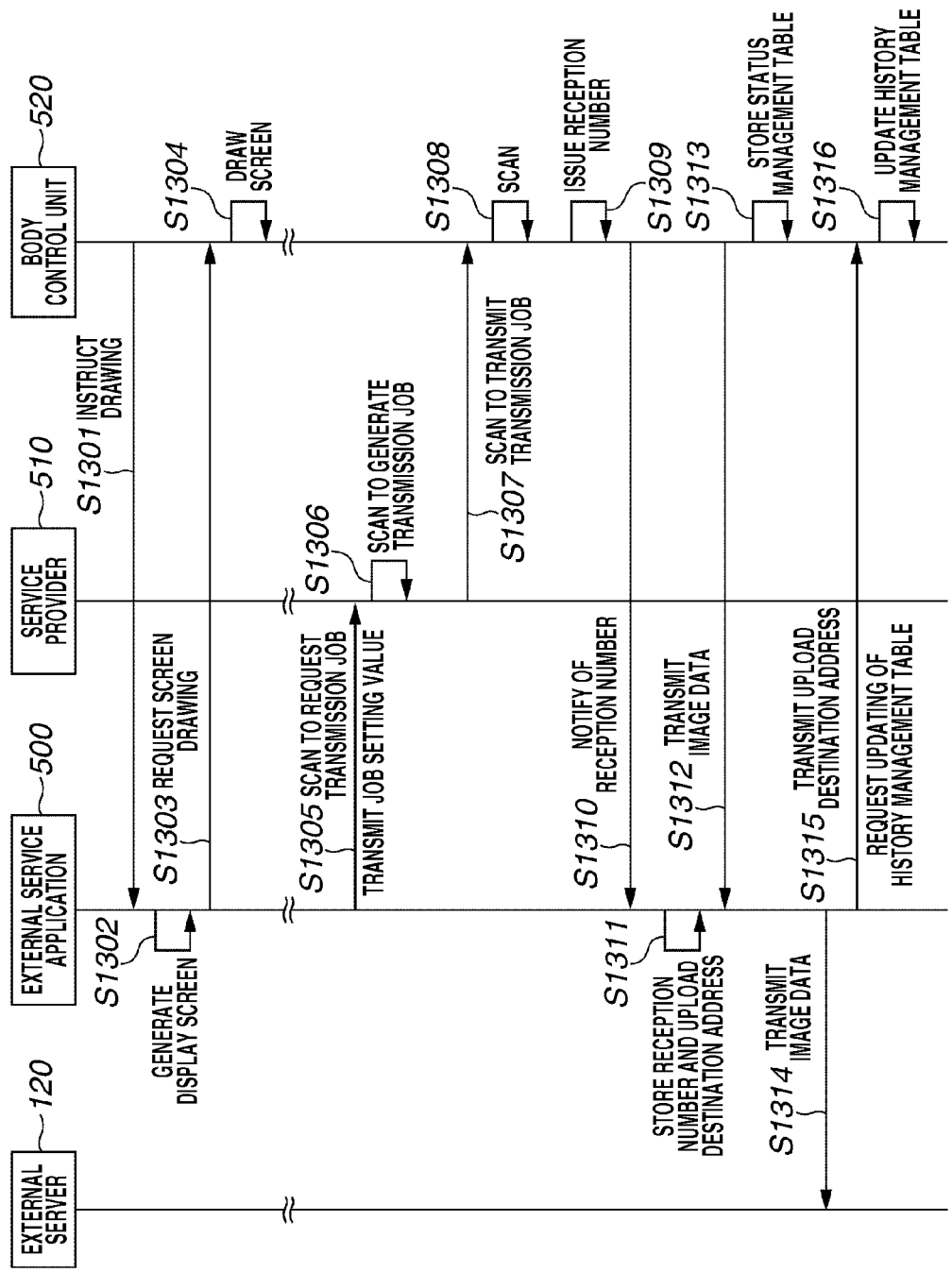
FIG. 13 is a flowchart illustrating an operation of an image processing system according to the fifth exemplary embodiment.

Characteristic processing of the fifth exemplary embodiment is described. FIG. 13 is a flowchart illustrating a series of processes where a job is stored in ongoing job history when transmission of the image data to the FTP server 1202 is completed, and stored in job completion history when uploading of the image data to the external server 120 is completed according to the fifth exemplary embodiment of the present invention. Each operation of the flowchart illustrated in FIG. 13 is achieved by executing each control program by a CPU 201 of an image processing apparatus 100 and a CPU 301 of an external server 120 respectively. Steps S1301 to S1312 and steps S1314 to S1315 are similar in content to steps S601 to S612 and steps S614 and S615, and thus description thereof is omitted.

In step S1313, the history management unit 1224 of the body control unit 1220 associates job information such as a transmission destination address, start time, a job type or a name of image data to be transmitted with the reception number issued in step S1209 to store it in the status management table 1225. FIG. 14A illustrates a job status screen 1400 displayed on an operation unit 209 by the screen drawing control unit 1227 of the body control unit 1220. The screen drawing control unit 1227 of the body control unit 1220 creates the job status screen 1400 based on the status management table 1225. A status 1401 indicates a current job status, and a character string such as "being uploaded" is displayed during job execution. Reception time 1402, a job type 1403, a counter party 1404, and a transmission file 1405 are displayed by reflecting the transmission destination address, the start time, the job type, and the image data name to be transmitted that are the job information stored in the status management table 1225 in step S1313.

In step S1316, the history management unit 1224 of the body control unit 1220 rewrites the transmission destination address associated with the reception number with an uploading destination address received in step S1315. FIG. 14B illustrates a job history screen 1410 displayed on the operation unit 209 by the screen drawing control unit 1227 of the body control unit 1220. The screen drawing control unit 1227 of the body control unit 1220 creates the job history screen 1410 based on the history management table 1226. A result 1411 indicates a result after job completion, and a character string such as "OK" or "NG" is displayed according to the job result. By displaying both of a reading result and job history, since the job status screen 1400 is displayed during job execution and the job history screen 1410 is displayed after job completion, the user can be notified of a more correct job status. An external service unit 1200 determines whether an external communication unit 1201 has successfully transmitted the image data to the external server 120. The external service unit 1200 transmits a purport indicating success to the body control unit 1220 when successfully transmitted, and a purport indicating failure when failed.

According to the present exemplary embodiment, information on ongoing job execution is stored when transmission of the image data to the FTP server 1202 is completed, and a job is stored for the first time in job history when uploading of the image data in the external server 120 is completed. Thus, since the job status screen is displayed during the job execution, and the job history screen is displayed after the job completion, the user can be notified of a more correct job status.

The third to fifth exemplary embodiments can be applied to the configuration of the second exemplary embodiment.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-223434 filed Oct. 1, 2010, which is hereby incorporated by reference herein in its entirety.

What is claimed is:

1. An image processing apparatus including a generation unit configured to generate image data based on a document read via a scanner unit and a first transmission unit configured to transmit the generated image data to a designated destination, the apparatus comprising: a transmission server; an instruction unit configured to instruct, according to reception of an uploading request to upload the generated image data to an external server communicable with the apparatus, the first transmission unit to transmit the image data to the transmission server;

a second transmission unit configured to acquire the generated image data, according to an instruction from the instruction unit, from the transmission server, and transmit the acquired image data to the external server; and a management unit configure to store transmission history when the first transmission unit transmits the image data to the transmission server as a first history, and to replace the first history with a second history that is the transmission history of the image data by the second transmission unit to store the second history when the second transmission unit transmits the image data to the external server, wherein the management unit stores a reception number issued when the first transmission unit transmits the image data to the transmission server in association with the first history, and replaces, when the second history and the reception number are acquired, the first history corresponding to the acquired reception number with the acquired second history to store the second history.

2. The image processing apparatus according to claim 1, wherein the management unit is further configured to store transmission history of the image data by the second transmission unit as history of an uploading request.

3. The image processing apparatus according to claim 2, further comprising a display unit configured to display, when an instruction to read transmission history of the image data by the first transmission unit is received, the transmission history of the image data by the second transmission unit stored by the management unit.

4. The image processing apparatus according to claim 1, wherein the first history contains at least a URL of the transmission server, and the second history contains a URL of the external server.

5. The image processing apparatus according to claim 4, wherein:

the management unit stores purport indicating incompletion of processing according to the uploading request when the first history is stored, and purport indicating completion of the processing corresponding to the uploading request when the second history is stored; and the display unit displays, when history is read at a time of incompletion of the processing corresponding to the uploading request, both of the first history and the purport indicating incompletion of the processing corresponding to the uploading request, and displays, when the history is read after completion of the processing corresponding to the uploading request, both of the second history and the purport indicating completion of the processing corresponding to the uploading request.

6. The image processing apparatus according to claim 5, wherein: when the second transmission unit fails to transmit the image data, the management unit stores the second history and purport indicating a failure of the processing corresponding to the uploading request; and the display unit displays both of the second history and purport indicating the failure of the processing corresponding to the uploading request.

7. A method for controlling an image processing apparatus, comprising:

generating image data based on a document read via a scanner unit by a generation unit;

transmitting the generated image data to a designated destination by a first transmission unit;

instructing, according to reception of an uploading request to upload the generated image data in an external server communicable with the apparatus, the first transmission unit to transmit the image data to a transmission server included in the apparatus by an instruction unit; acquiring the generated image data, according to the instruction from the instruction unit, from the transmission server, and transmitting the acquired image data to the external server by a second transmission unit that performs data communication with the external server;

storing transmission history when the first transmission unit transmits the image data to the transmission server as a first history;

replacing the first history with a second history that is the transmission history of the image data by the second transmission unit to store the second history when the second transmission unit transmits the image data to the external server;

storing a reception number issued when the first transmission unit transmits the image data to the transmission server in association with the first history; and replacing, when the second history and the reception number are acquired, the first history corresponding to the acquired reception number with the acquired second history to store the second history.

8. The method according to claim 7, further comprising storing transmission history of the image data by the second transmission unit as history of an uploading request.

9. The method according to claim 8, further comprising displaying, when an instruction to read transmission history of the image data by the first transmission unit is received, the transmission history of the image data by the second transmission unit.

10. The method according to claim 7, wherein the first history contains at least a URL of the transmission server, and the second history contains a URL of the external server.

11. A non-transitory storage medium for storing a program to cause an image processing apparatus to implement the control method according to claim 7.

12. The non-transitory storage medium according to claim 11, wherein the method further comprises storing transmission history of the image data by the second transmission unit as history of an uploading request.

13. The non-transitory storage medium according to claim 12, wherein the method further comprises displaying, when an instruction to read transmission history of the image data by the first transmission unit is received, the transmission history of the image data by the second transmission unit.

14. The non-transitory storage medium according to claim 11, wherein the first history contains at least a URL of the transmission server, and the second history contains a URL of the external server.

* * * * *